Patented Oct. 13, 1931

1,827,080

UNITED STATES PATENT OFFICE

MAX GADE, OF MANNHEIM-WALDHOF, GERMANY, ASSIGNOR OF ONE-HALF TO ZELLSTOFFFABRIK WALDHOF, OF MANNHEIM-WALDHOF, GERMANY, A GERMAN COMPANY

TREATING SULPHITE LIQUOR SPIRIT

No Drawing. Application filed April 11, 1930, Serial No. 443,614, and in Germany April 24, 1929.

In the distillation of spirit from sulphite liquor, the first runnings which are collected contain much aldehyde and are therefore of little value. There has been no lack of attempts to reduce this concentration of aldehyde or to remove it altogether. The aldehyde vapour has been concentrated for example, in the so-called air coolers or heaters of the distilling apparatus, and in this state has been allowed to be carried off by the natural ventilation of the distilling apparatus, or if necessary with the aid of an artificial current of air. This method, however, possesses the great drawback that uncontrollable amounts of alcohol are carried away along with the aldehyde and are lost. This process, therefore, is inadequate and uneconomical.

It has now been shown in a remarkable manner that the aldehyde fraction may be profitably removed almost completely, and without loss of alcohol, by reconducting, either continuously or periodically, the first runnings containing aldehyde to the fermenting vats, that is to say, leading them back to the fermentation process. The sulphite liquor spirit obtained from the fermentation of such a charge supplied with first runnings containing aldehyde does not evince any increase in the aldehyde content corresponding with the added amount of aldehyde first runnings, but contains always only as much aldehyde as it would have contained under normal conditions if no further amounts of aldehyde had been added. The aldehyde which is added with the first running is evidently removed, therefore, during the process of fermentation in the fermenting vats, possibly by a reduction. Since, in addition to aldehyde, the first runnings contain about 75% alcohol, this fraction, which hitherto was lost with the first runnings or was obtained in the form of an inferior product, now passes over perfectly pure in the main fraction, and is thus obtained in the form of a very valuable product. Thus the first runnings obtained from one fermentation mixture are always taken up by the next succeeding fermentation mixture, so that, for an endless series of fermentation mixtures, only one lot of first runnings will be collected, namely, that produced in the last fermentation mixture of the series.

The practical application of the process has shown that, in the mash to which has been added aldehyde first runnings, and after the completion of the usual fermentation period, aldehyde can be detected only in amounts which show that the aldehyde content is not increased by the added aldehyde. It is absolutely impossible for alcohol to be lost through evaporation in the process during fermentation, that is to say, at a temperature of 35° to 39° C.; even the evaporation of the aldehyde will be restricted to imperceptible amounts, when one considers the high degree of dilution with water in which these fractions are present in the fermenting vats. Consequently, there exists a fair probability for the above-mentioned assumption, that perhaps the aldehyde is converted by reduction into alcohol, thus increasing the alcohol yield, if only by a very small fraction.

The process may be carried out, for example, as follows. The first runnings are taken either continuously or periodically from the head of the distilling apparatus, and by means of pipe lines are introduced into the fermenting vats, which as far as possible should be freshly charged. Fermentation is then carried out in the known manner, and after completion thereof, the spirit is distilled as usual. The first runnings thereby obtained contain only the amount of aldehyde which has been formed by the freshly fermented mash, and are now supplied, either periodically or continuously, to the next fermentation mixture.

I claim:—

1. Process for the removal of the aldehyde fractions passing over with the first runnings in the distillation of sulphite liquor spirit, comprising fermenting a series of mashes, distilling the alcohol from each mash, separating the first runnings as a part of said distillation, periodically conducting the first runnings from one mash into a second fresh mash, and subjecting them therein to the fermentation process, whereby the aldehydes produced in each mash are removed during the fermentation in the next succeeding mash.

2. Process for the removal of the aldehyde fractions passing over with the first runnings in the distillation of sulphite liquor spirit, comprising fermenting a series of mashes, distilling the alcohol from each mash, separating the first runnings as a part of said distillation, periodically conducting the first runnings from one mash into a second mash which is fermenting and subjecting them therein to fermentation, whereby the aldehydes produced in each mash are removed during the fermentation in the next succeeding mash.

3. Process for the removal of the aldehyde fractions passing over with the first runnings in the distillation of sulphite liquor spirit, comprising fermenting a series of mashes, distilling the alcohol from each mash, separating the first runnings as a part of said distillation, continuously conducting the first runnings from one mash into a second fresh mash, and subjecting them therein to the fermentation process, whereby the aldehydes produced in each mash are removed during the fermentation in the next succeeding mash.

4. Process for the removal of the aldehyde fractions passing over with the first runnings in the distillation of sulphite liquor spirit, comprising fermenting a series of mashes, distilling the alcohol from each mash, separating the first runnings as a part of said distillation, continuously conducting the first runnings from one mesh into a second mash which is fermenting and subjecting them therein to fermentation, whereby the aldehydes produced in each mash are removed during the fermentation in the next succeeding mash.

In testimony whereof I have signed my name to this specification.

MAX GADE.